United States Patent [19]

Michael

[11] 4,138,285
[45] Feb. 6, 1979

[54] FILAMENT ROD CONSTRUCTION AND METHOD OF FORMING THE SAME

[75] Inventor: Vesta F. Michael, Big Spring, Tex.

[73] Assignee: Fiber Glass Systems, Inc., Big Spring, Tex.

[21] Appl. No.: 832,160

[22] Filed: Sep. 12, 1977

Related U.S. Application Data

[62] Division of Ser. No. 684,098, May 7, 1976, Pat. No. 4,063,838.

[51] Int. Cl.² .................................................. B65H 81/00
[52] U.S. Cl. .................................... 156/161; 156/162; 156/165; 156/172; 156/180; 428/377
[58] Field of Search ............... 156/172, 173, 175, 161, 156/162, 165, 425, 430, 431, 432, 441, 180; 403/343, 404, 599, 377, 375; 285/423; 138/109

[56] References Cited

U.S. PATENT DOCUMENTS

| | | | |
|---|---|---|---|
| 2,558,855 | 7/1951 | Knewstubb et al. | 156/169 |
| 2,602,766 | 7/1952 | Francis | 156/148 |
| 2,684,318 | 7/1954 | Meek | 156/180 |
| 3,033,729 | 5/1962 | Shobert | 156/149 |
| 3,202,560 | 8/1965 | Michael | 156/162 |
| 3,212,664 | 10/1965 | Wagle | 220/83 |
| 3,306,797 | 2/1967 | Boggs | 156/172 |
| 3,381,716 | 5/1968 | Michael | 285/423 |
| 3,407,101 | 10/1968 | Lockshaw | 285/423 |
| 3,442,738 | 5/1969 | Scott et al. | 156/180 |
| 3,470,051 | 9/1969 | Meyer | 156/172 |
| 3,661,670 | 5/1972 | Pierpont, Jr. | 156/172 |
| 3,673,029 | 6/1972 | McLarty | 156/172 |
| 3,784,441 | 1/1974 | Kaempen | 156/161 |
| 3,929,543 | 12/1975 | Scott et al. | 156/172 |

Primary Examiner—Michael W. Ball
Attorney, Agent, or Firm—Neuman, Williams, Anderson & Olson

[57] ABSTRACT

A rod construction has an inner core of high tensile strength such as a rod or bar of high tensile steel. The reinforcement core has a plurality of surface indentations, preferably uniformly arranged at spaced intervals along the length of the core periphery. Layers of tensioned longitudinal and spiral filaments embedded in a resin matrix are formed about the core periphery so as to provide a rod of excellent strength and corrosion resistance. Also a rod is formed by spirally winding on a rotating assemblage of longitudinal filaments.

12 Claims, 17 Drawing Figures

FILAMENT ROD CONSTRUCTION AND METHOD OF FORMING THE SAME

This is a division of application Ser. No. 684,098 filed May 7, 1976, now U.S. Pat. No. 4,063,838.

FIELD OF THE INVENTION

This invention relates to a rod construction, and more specifically pertains to a rod construction particularly adapted to function as a sucker rod in production oil wells.

In a production oil well in which the subsurface pressure is insufficient to effect oil flow, the oil may be elevated by subsurface pump having its discharge barrel connected to the bottom of a string of tubing. The pump plunger is operated by sucker rods passing up through the tubing. The sucker rod string is reciprocated in the vertical plane by actuating means at the surface and the oil is pumped to the surface through the tubing string.

In the course of such reciprocation, long rod strings are subjected to severe flexing and tensile stresses since the rod string must not only be self-supporting but, in addition, must support the head of oil in the well tubing disposed above the pump plunger in which the rod string is reciprocating. It is also known that oil production from different fields varies in corrosiveness and the resulting degree of attack on the rods; such attack may be so severe as to result in metal rod failure after short periods of use.

BACKGROUND OF THE INVENTION

Although the prior art has recognized the desirability of plastic-surfaced sucker rods as in Brown U.S. Pat. No. 3,212,582 for purposes of reducing paraffin build-up on such sucker rods, the art has not suggested the use of a partially plastic, glass-reinforced sucker rod construction for purposes of providing superior strength as well as superior operating characteristics.

In accordance with one embodiment of this invention, a novel rod construction comprising a core of high tensile material such as 4130 steel is embedded within an outer shell of glass filament-reinforced cured resin. The tensile strength provided by the shell provides the composite rod construction with excellent tensile strength and flexing characteristics, although lighter in weight than a steel rod of comparable size. The provided rod, in addition to the exceptional strength characteristics, possesses the corrosion resistance of a chemically inert resin, a most desirable characteristic when employed in oil field operations.

It is an object of this invention, therefore, to provided a novel, composite rod construction comprising a high tensile steel core encapsulated in a cured resin shell reinforced by glass filaments.

It is a further object of this invention to provide a reinforced sucker rod construction having a superior flexural modulus, of optimum weight which is of less weight than a rod of solid steel so as to minimize energy consumption in the course of pump operation while being of adequate weight so as to allow efficient insertion into a well tubing in the absence of excessive flexing and "floating."

It is another object of this invention to provide a rod construction having shear-resistant threads integrally formed in a female coupling end by use of a novel reinforcing band embedded in said end. Such threads may also be formed in a discrete coupling member adapted to engage the pin ends of joined rods.

It is a further object of this invention to provide a novel method of forming a sucker rod construction in which the excellent tensile strength of glass is employed to contribute to the overall tensile strength of the rod construction.

It is another object of this invention to provide a novel rod construction consisting of longitudinal and spiral layers of glass filaments under tension embedded in a matrix of cured resin which is of exceptional tensile strength and corrosion resistance and particularly adapted for use in applications requiring such desired properties as well as light weight.

The above and other objects of this invention will become apparent from the following detailed discussion when read in the light of the accompanying drawing and appended claims.

In one embodiment of this invention a longitudinal assemblage of glass roving strands is positioned about the periphery of a high tensile steel core, parallel to the core axis and placed under tension. The glass filaments comprising the strands are preferably untwisted to eliminate self-cutting action thereof. The steel rod or bar comprises the core of a composite rod construction in which a cured resin shell is disposed about the entire outer core periphery.

The steel core may be threaded or provided with regularly spaced annular indentations disposed along the core axis and arranged substantially normal to said axis. The glass filament or strand assemblage is locked adjacent opposed ends of the core while in the tensioned state, and saturated with a hardenable epoxy resin composition. With the resin in the uncured state, spiral windings of resin-saturated glass roving are wound along the core length so as to urge the longitudinal glass filaments into the surface indentations.

Additional layers of resin-saturated longitudinal strands and spiral windings are applied to the core until a rod of desired dimensions is formed. The resin is then cured at desired curing temperatures, care being taken during the cure to avoid separation or delamination between the core and the surrounding resin jacket. In accordance with another embodiment of this invention each spiral filament layer comprises two strata of filaments wound under tension about the underlying, rotating rod core portion, with the tension imparted by each layer spiral component being neutralized by the other spiral component as will hereinafter be explained in greater detail.

Resin male teeth may be formed about the external periphery of one completed rod end by means of an appropriate male thread mold. A reinforcing metal band may be centrally embedded in the resin shell at the opposed coupling rod end having female threads therein. Such teeth may be formed adjacent the inner periphery of the reinforcing band by means of a female thread mold as will hereinafter be explained in greater detail.

In an embodiment of a rod construction formed in accordance with this invention, the core reinforcement above described is omitted and the rod consists of tensioned longitudinal spiral filament layers embedded in a resin matrix. The innermost center "core" or layer of such a rod comprises longitudinal resin-saturated filaments under tension rotated as a unit and about which are wound resin-saturated spiral filaments under tension. The spirals are wound simultaneously in such a manner whereby the tensions on the rotating, partially formed rod portion exerted by the spiral filaments offset each other, resulting in a straight rod construction of high tensile strength and corrosion resistance.

For a more complete understanding of this invention, reference will now be made to the drawings wherein.

Figure 1:
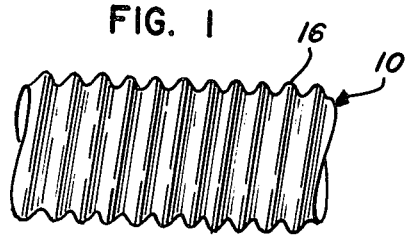
FIG. 1 is a fragmentary elevational view of a threaded core member which may be employed as a reinforcing element in one embodiment of the rod construction provided in accordance with this invention.

Referring now more particularly to FIG. 1, a fragment of a threaded rod which may form the reinforcing core of a rod construction made in accordance with the teachings of this invention is illustrated. Core fragment 10 is seen to possess a regularly formed thread thereon such as may be formed by a thread die. An alternative core construction may comprise core fragment 12 illustrated in FIG. 2 in which regular indentations 14 may be formed by grooved wheels or the like which have pressed against and deformed the outer periphery of the rotating rod fragment 12. Such indentations differ from the threads 16 illustrated in FIG. 1 which are regularly formed with a predetermined pitch.

Figure 2:
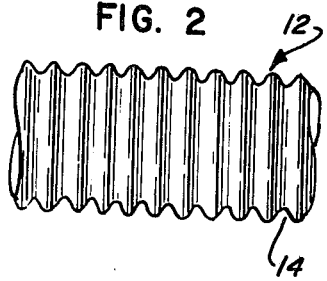
FIG. 2 is a fragmentary elevational view of a modified reinforcing core element which may be employed in a reinforced rod construction of this invention.

The cores 10 and 12 of FIGS. 1 and 2, respectively, in accordance with the teachings of this invention, are adapted to be formed of high tensile strength steel and function as reinforcements in rod constructions having an overlying coating or shell of glass-reinforced resin, thereby affording the steel cores superior corrosion resistance. Such reinfroced rod constructions are to be used in environments where engagement with corrosive gases and liquids is to be expected. Thus the reinforced rod constructions of this invention are particularly suited for downhole used in oil fields in which application of great tensile strength is required in addition to corrosion resistance.

In accordance with my invention, the threads or recesses of the rods 10 or 12 which are employed as reinforcing cores in the reinforced rod construction serve as anchoring devices for overlying layers of glass filaments. The tensile strength of glass filaments is known to be extremely high, glass fibers having tensile strengths of between 250,000 to 400,000 p.s.i. Accordingly, by enveloping the reinforcing steel cores 10 or 12 with longitudinal layers of glass filaments arranged along the length of such metal cores, the tensile strength of such filaments will be directly utilized when the resulting rod construction is placed under tension.

Figure 3:
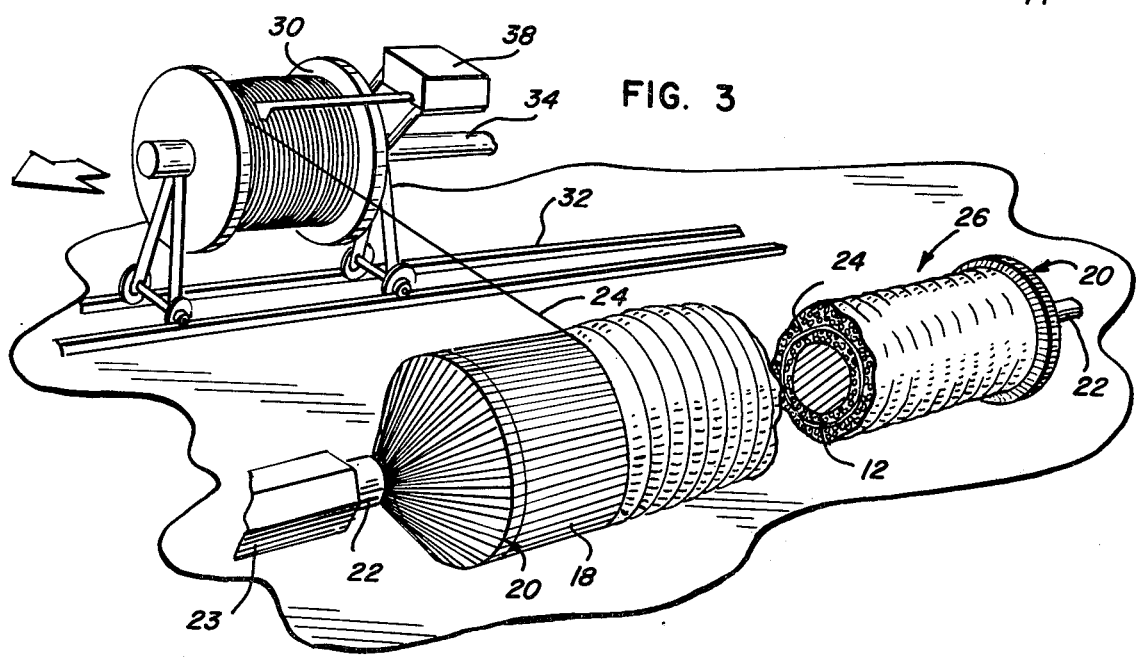
FIG. 3 is a fragmentary perspective view, partly broken away, illustrating a reinforced rod construction made in accordance with this invention in the process of being formed, together with apparatus employed during formation.
Figure 9:
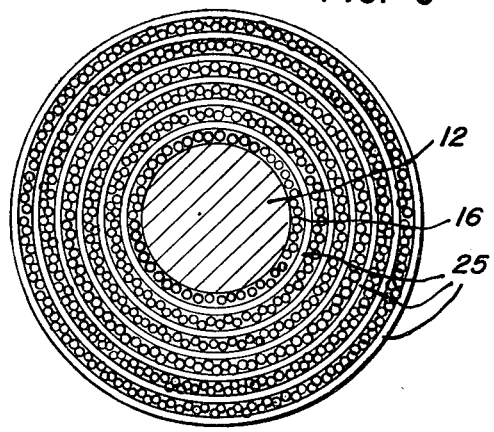
FIG. 9 is a sectional view of a glass reinforced rod member having a central reinforcing metal core.

Pursuant to the method of rod fabrication hereinafter set forth in detail, a longitudinal sock of untwisted glass filaments, such as sock 18 illustrated in FIG. 3, is first disposed about the outer periphery of the reinforcing metal core 12 and tied down at opposed ends to projecting posts 22 of opposed clamp plates 20 abutting against opposed ends of the core 12. It should be noted that in FIG. 3, illustrated reinforced rod construction 26, shown partly broken away, is in an intermediate stage of construction and a spiral, roving glass layer 25 (see FIG. 9) is illustrated in the process of being applied to the periphery of the partially formed rod over longitudinal layer 18 as the rod is turned by the opposed clamp plates. Following the tying down of the sock 18 at opposed ends, it is saturated with a hardenable resin composition which may be applied thereover; such composition by way of example may comprise epoxy resin in admixture with a hardener comprising triethylenetetramine.

Following these initial steps the core 12 is rotated by the clamping plates 20 which frictionally or otherwise engage the core ends therebetween. The plates may be mounted for rotational movement in a lathe, and as seen in FIG. 3, the left end of the assembly may be rotatably driven by chuck 23, and end 22 of opposed plate 20 may be rotatably mounted in a supporting bearing, not illustrated.

In the course of rotational movement, a spiral layer 25 of glass roving 24 is wound tautly about the rotating core 12 and longitudinal sock 18. The sock filaments are urged into the recesses or indentations 14 of the core 12 so as to increase still further the tension therein. By imparting additional tension to the filaments of the sock 18, the strength of the ultimate rod construction is increased since any tension exerted along the longitudinal axis of the completed rod 26 is reacted to not only by the central metal core reinforcement 12 but also fully by the longitudinal filaments comprising the sock 18. Thus optimum use is made of the high tensile strength of the longitudinal glass filaments.

It will be noted from FIG. 3 that the spiral roving 24 may be unwound from a reel 30 which may move along the length of the partially completed rod 26 as the same is rotated and axially driven by means of a threaded shaft 34 or the like in a manner well known in the art. The reel may move along track 32 and be reciprocated by a reversible motive means, not illustrated, which drives shaft 34. It will be noted, in addition from FIG. 3, that in the course of being unwound from reel 30, the glass roving filaments 24 passing from the reel 30 onto the periphery of the partially formed rod 26 are saturated by dispenser 38 with a hardenable resin composition such as a composition comprising twelve parts of epoxy resin to one part of a hardener such as triethylenetetramine. Thus the roving 24, upon reaching the periphery of the partially formed rod 26, is resin-saturated.

As above noted, the longitudinal roving filaments, following disposition about the periphery of the metal core 12 and about the periphery of the underlying partially formed portion of the rod 26, are also saturated with the same resinous composition; or, in an alternate method of application, the longitudinal socks may have the resinous material painted thereon following disposition on the outer periphery of the partially formed rod as the same rotates.

Figure 4:
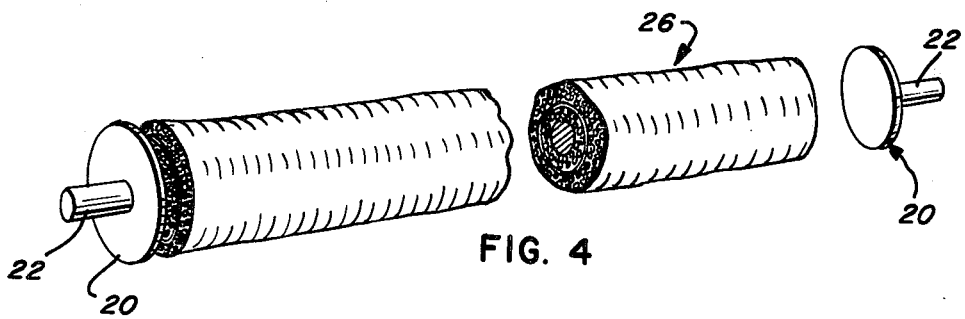
FIG. 4 is a fragmentary perspective view of a rod member formed in accordance with the teachings of this invention, partly broken away, and illustrating clamping members in spaced-apart relationship with end portions of the partially-formed, reinforced rod.

Following buildup of the rod 26 to a desired diameter, such as illustrated in FIG. 4, the resin therein is allowed to initially cure at substantially room temperature or slightly thereabove (80° F. — 100° F.) for about fifteen to thirty minutes so as to assure an initial resin set and the absence of any relative movement between the central metal core and the surrounding glass-resin shell. After the initial resin set or cure has occurred, the resulting rod construction may be cured at an elevated temperature of about 200° F. to 250° F. for between about thirty minutes and an hour. After final cure, the opposed anchor plates 20 may be cut free from the interposed formed rod and the opposed rod ends ground smooth about their exterior periphery and at their terminal ends. To facilitate disengagement between rod 26 and end plates 20, the inner faces of the plates may be coated with wax or other parting agent prior to clamping the core ends therebetween.

Figure 5:
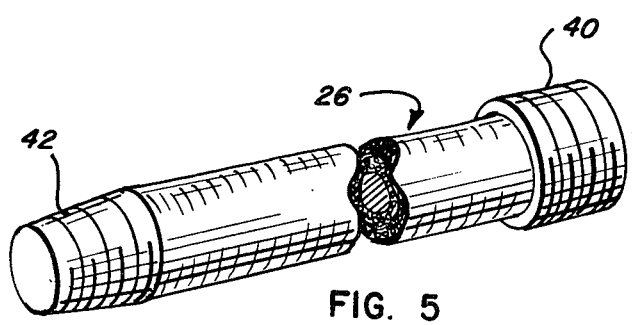
FIG. 5 is a perspective view, partially broken away, of a reinforced rod construction made in accordance with the teachings of this invention having male threads formed on the left-hand end thereof and having male threads in the process of being formed on the right-hand end thereof.
Figure 7:
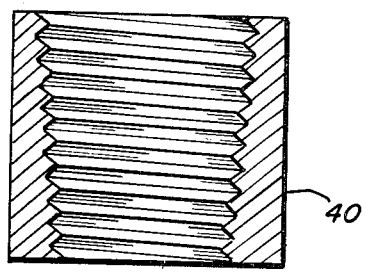
FIG. 7 is a longitudinal sectional view of a mold member adapted to form male threads on the exterior end surface of a reinforced rod construction made in accordance with the teachings of this invention.

The opposed ends of such a reinforced rod construction may have male threads formed integrally thereon as by means of male thread mold 40 illustrated in FIG. 7. FIG. 5 illustrates a completed rod construction 26 having male threads 42 formed about the left end portion thereof, the mold 40 being disposed about the right-hand portion thereof in the normal process of thread formation from a plastic resinous mass. The latter, by way of example, may comprise 100 parts of epoxy resin, 12 parts of a hardener such as triethylenetetramine based upon the weight of the resin, 30 parts per weight of the resin of a silica powder which may be 200 mesh, and 2 parts per 100 parts by weight of the resin of a thixotropic agent such as that sold under the brand name of CAB-O-SIL. In the process of having the threads formed on the opposed rod ends, a hardenable epoxy resin composition may be applied to the opposed rod terminal ends to insure a continuous protective shell of hardened resin about the centrally disposed metal core.

Figure 10:
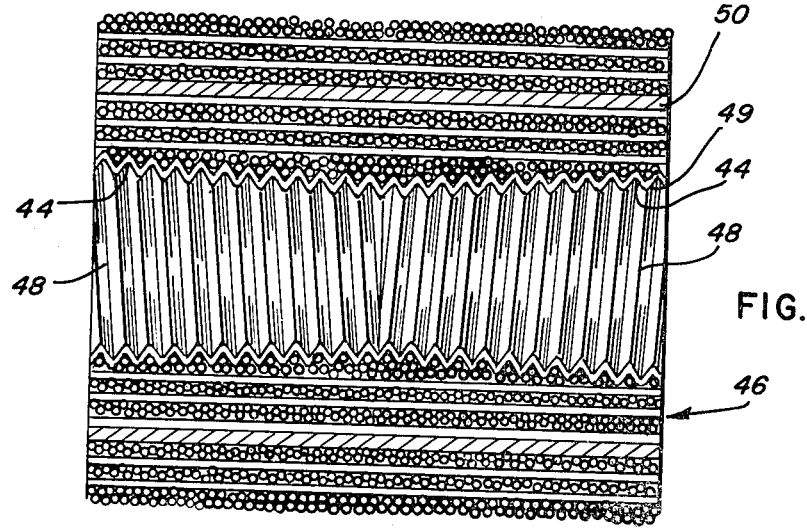
FIG. 10 is a sectional view similar to FIG. 6 of a coupling member and female thread forms disposed therein, the coupling having opposed female threads adapted to receive the male threads of rods formed in accordance with the teachings of this invention such as the male threads of the rod illustrated in FIG. 5 of the drawings.

The rod 26 of FIG. 5 having male threads 42 formed on opposed pen ends thereof may engage opposed female threads 44 of coupling 46 illustrated in FIG. 10. Coupling 46 is illustrated in section in FIG. 10 which reveals details of the construction thereof. The interior tapered female threads 44 formed by means of threaded nipples 48, the male threads of which serve as the thread forms and are coated with a separating agent such as paraffin wax layer 49 prior to the buildup thereover of alternate layers of spiral roving and longitudinal roving.

As above noted, the rod main body portion may have the innermost glass layer comprise a longitudinal sock which is drawn into the thread recesses or depressions by means of an overlying spiral roving layer for purposes of increasing the tension on such longitudinal glass rovings and thereby obtain optimum benefit from the tensile strength thereof. However, in the formation of the female threads 44 of the coupling 46 about the male threads of the nipples 48 illustrated in FIG. 10, the roving initially applied to the male threads 48 may comprise spiral roving saturated in epoxy resin whereby the hoop strength of the resulting female threads may be increased. In the process of coupling formation, after approximately one-half of the thickness of the coupling has been completed, a preformed cylinder may be wedged over the partially finished periphery, or a metal plate may be bent snugly about the periphery of the partially formed coupling and welded in place. Resulting ring 50, illustrated in FIGS. 8 and 10, serves as a rigidifying base or anchor for the adjacent spiral filaments and epoxy matrix forming the female threads 44, greatly improving the shear strength thereof. When inserting the reinforcing cylinder or welded plate in place, it is desirable to harden the partially completed rod first and following plate or ring insertion the remainder of the rod outer periphery may be completed.

Figure 8:
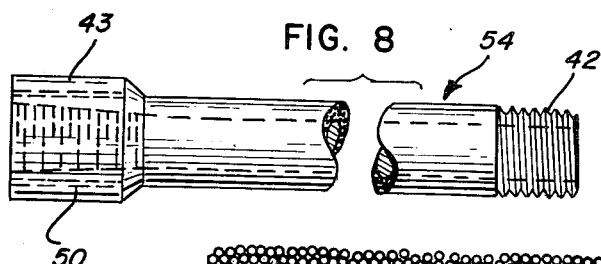
FIG. 8 is a fragmentary elevational view, partially broken away, of a rod construction made in accordance with the teachings of this invention having male threads formed on one end portion and transverse female threads formed on the opposed end portion thereof.

FIG. 8 is illustrative of a rod made in accordance with the teachings of this invention which may have one end formed with male threads 42 thereon and an opposed end having female threads formed in a coupling portion thereof. In FIG. 8, the male threads 42 are disposed on the right end of the rod and female coupling 43 having internal female threads is formed on the left end of the rod.

Figure 6:
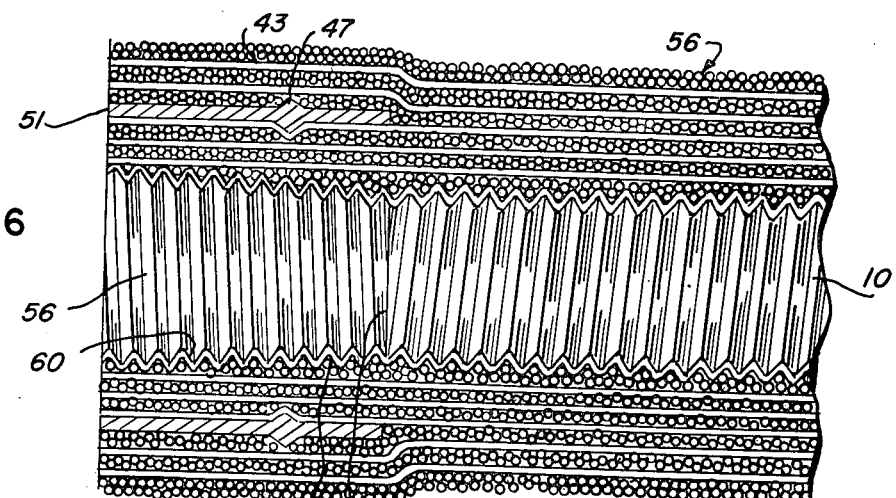
FIG. 6 is a fragmentary sectional view of an end portion of a reinforced rod construction made in accordance with the teachings of this invention in which female threads are formed integrally in a coupling end portion of such rod construction.

FIG. 6 is a sectional view illustrating the manner whereby such a rod 54 may be formed. In FIG. 6 threaded form 10 disposed on the right-hand portion of the figure is in end-to-end abutting relationship with a nipple 56 having tapered male threads 58 thereon for purposes of forming female threads 60 in the resulting coupling end portion 43. Interface 62 between the abutting end of the high tensile strength rod 10 and the nipple 56 has a parting agent such as paraffin wax coated thereon so as to assure ready threaded withdrawal of the nipple 56 after the female threads have been formed. The ends of the reinforcing core 10 may have a hardened layer of resin applied thereover prior to use in the process for insuring complete encapsulation and resulting corrosion resistance. It will be noted from FIG. 6 that a spiral ring or band 51 is employed in the coupling portion for purposes of functioning as an anchoring base for the formed female threads 60 formed about the nipple 56 and composed of spiral roving and epoxy resin. Following buildup of the body portion of the rod 54 to the desired dimensions and the buildup of the coupling portion 43 to the desired dimensions, the resulting assembly of FIG. 6 is cured at slightly above room temperature, about 100° F. to assure a set of the epoxy resin without causing relative movement between the metal core 10 and the surrounding glass-resin body whereafter a final cure at an elevated temperature of between 200° F. and 250° F. is effected until the desired hardness is assured. Such curing method avoids the formation of internal fissures and gaps which would serve as focal points for failure when the rod is placed under stress, and assures a gap-free integral core-shell construction.

In accordance with this invention, the steel core insert is preferably of high tensile strength, such as high carbon steel designated "4130". It has been found that by inserting a high tensile steel core, the strength of a sucker rod is increased substantially. By way of example, the flexural modulus of a sucker rod composed of a resin-glass-reinforced rod 1¼ inches in diameter and having no steel reinforcement was increased from $4.6 \times 10^6$ p.s.i. to $6.2 \times 10^6$ p.s.i. when a ⅜ inch high tensile steel rod insert of 4130 steel was employed in a rod construction made in accordance with this invention having a total diameter of 1⅛ inches. It is apparent that the dimensions of the final rod construction may vary to suit the particular purpose for which designed, and the dimension of the reinforcing core may also vary for purposes of providing the desired strength characteristics.

It should be appreciated that the high tensile steel core employed in the above-described sucker rod application for use in oil fields does not merely provide reinforcement but, in addition, rovides additional weight to avoid whiplash or excessive flexing which would occur in the course of reciprocating a lighter weight rod composed wholly of glass-reinforced plastic, such as a novel rod hereinafter described in detail.

The presence of the steel core also provides desired rigidity which prevents flexing and resulting fatigue which would occur in a glass-reinforced resin rod having no steel rigidifying core.

In addition, by virtue of the indented or recessed nature of the periphery of the reinforcing cores employed in the rods of the provided invention, the longitudinal glass-reinforcements are placed under additional tension as the overlying spiral reinforcements force such longitudinal glass filaments or roving to enter into the threads or recesses of the core. As a result, full advantage is obtained of the high tensile strength of the glass reinforcements. Since such sucker rod and equivalent applications are mainly subjected to tensile forces, optimum use is made of the longitudinal glass filament reinforcements.

The epoxy threads formed in accordance with the teachings of this invention have great shear resistance, the resistance being greatly assisted by the adjacent disposition of the anchoring metal annulus with respect to the female threads above described. In accordance with this invention, in the instance of rod constructions of sufficiently large dimensions, the male threads may also be formed adjacent a steel bent plate or annulus which is embedded in the rod body beneath the male threads formed thereover. Thus in accordance with this invention, the right-hand portion of rod 54 illustrated in FIG. 8 may also have an annular plate similar to plate 50 of FIG. 10 formed beneath the male threads to reinforce said male threads 42 against axial shear. Also, to obtain maximum anchoring of the plate members employed for reinforcing purposes in the provided invention, plate 50 may have projections 47 (FIG. 6) disposed on opposed faces thereof to assist in anchoring the plate in the body of the coupling or rod which is integrally formed.

The foregoing description has been specific to a rod construction and method of manufacturing the same in which a reinforcing core is centrally disposed in the rod formed. In those applications in which the added weight and strength of a steel core is not necessary or desired, a glass-reinforced-resin rod construction may be formed without a core reinforcement.

Figure 11:
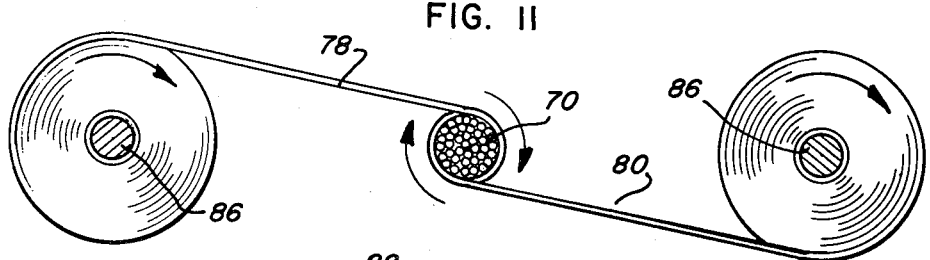
FIG. 11 is a somewhat schematic, side elevational view of opposed glass filament reels in the course of simultaneously feeding spiral wraps onto a central, partially-formed rod construction having no reinforcing core.
Figure 15:
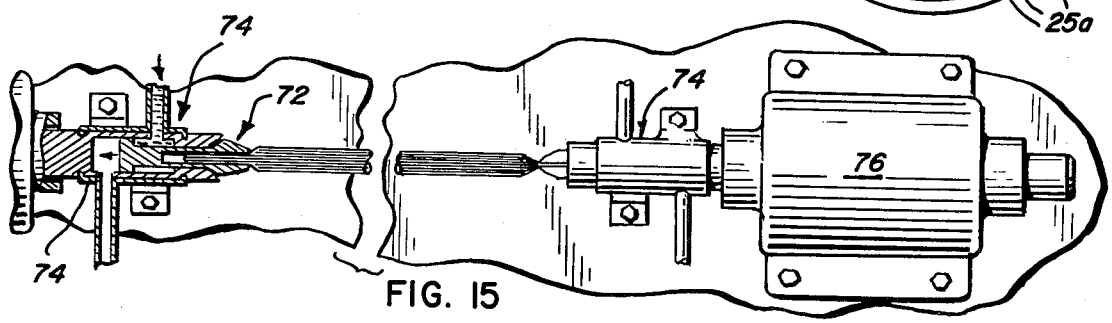
FIG. 15 is a fragmentary elevational view of apparatus elements adapted to form a glass-reinforced resin rod having no core reinforcement.

In such a method of rod manufacture, the rod central core comprises longitudinal glass filaments which are placed under tension. Thus in FIG. 12 a longitudinal assemblage 70 of glass filaments saturated in a curable resin mixture such as epoxy resin and triethylenetramine is clamped in opposed jaws of the chucks 72 and the chucks may be moved apart as by the hydraulic units 74 illustrated in FIG. 15 to place the filaments of the interposed assemblage 70 under tension. The tensioned filaments are then rotated by means of motors 76 connected to the opposed glass-anchoring chucks 72. The motors rotate the opposed assemblage end portions in the same direction of rotation at exactly the same speed of rotation whereby the longitudinal filaments 70 remain straight, untwisted and under tension. During rotation, spiral filaments 78 and 80 (see FIGS. 11 and 12) are unwound from rotatable reels 82 and 84, respectively, which are moved along the length of the rotating assemblage 70 by motor driven screws 86 or equivalent motive means forcing the opposed reels 82 and 84 to move at desired and substantially identical linear speeds. Friction brakes or equivalent means may be employed to insure the application of the spiral windings of the filaments 78 and 80 under desired tension to the periphery of the assemblage 70 as said filaments are unwound from rotatable reels 82 and 84. The latter reels are rotatably mounted on flanged, non-rotatable supports 84 which are forced to move along the screw shafts 86 on which they are threadedly mounted but unable to rotate therewith because of interconnecting strap 88 secured to flange portions of the supports 84. Thus as the shafts 86 rotate, the supports 84 are axially driven along the length of assemblage 70 and filaments 78 and 80 played out under tension as the reels 82 and 84 rotate.

Figure 12:
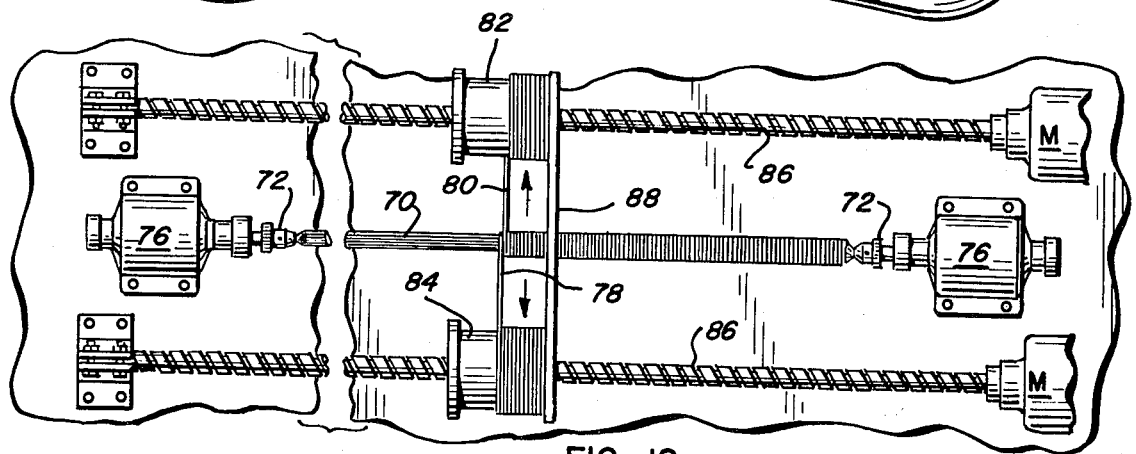
FIG. 12 is a top plan view of apparatus employed in forming a glass reinforced-resin rod having no central core reinforcement.
Figure 14:
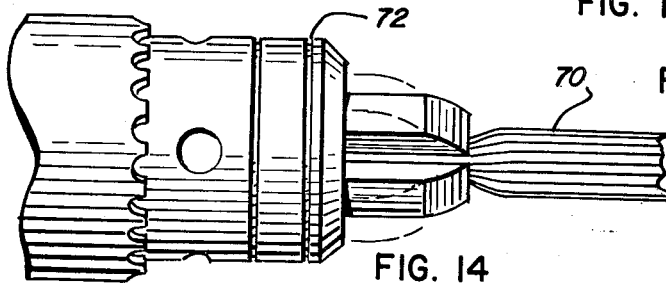
FIG. 14 is a side elevational view of a chucking device which may be employed to securely engage opposed ends of a partially formed rod for purposes of rotating the same during formation thereof.

Referring to FIG. 12, it will be noted that the reels 82 and 84 are substantially directly opposed and accordingly any pull exerted on the assemblage 70 by the spiral filaments 78 or 80 is neutralized by the pull of the opposed spiral filaments. To enable the filaments to be simultaneously wound about the assemblage from the opposed reels 82 and 84, the filaments must approach the rotating assemblage 70 so as to be substantially oppositely disposed at the points of peripheral engagement with assemblage 70 in the manner illustrated in FIG. 12. The filaments are wound in overlying layers and engage assemblage 70 at adjacent points as also illustrated in FIG. 12.

Figure 13:
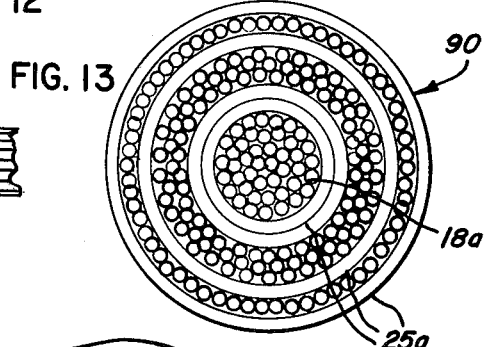
FIG. 13 is a transverse sectional view of a rod formed in accordance with this invention having no central core reinforcement.

All filaments are saturated with a hardenable resin composition at the time of application, passing through a resin bath or have resin dispensed thereon as by a dispenser 38 illustrated in FIG. 3 at substantially the instant of application to the periphery of assemblage 70. After the spiral wrap of FIG. 12 is applied, a new longitudinal assemblage is applied thereover and tensioned, and the above-described procedures repeated until a rod of desired dimensions has been built up. Subsequent longitudinal assemblages may be tensioned by means of concentric tensioning means arranged about chucks 72, which assemblages are tied down onto the surface of the already completed rod by spiral wraps, or subsequent assemblages may also be engaged by the chucks 72 which are again tensioned after engagement with each longitudinal assemblage and the partially completed rod. The final rod section is as appearing in FIG. 13 comprising alternate longitudinal and spiral glass layers 18a and 25a, respectively, embedded in a resin matrix. After an annular reinforcement such as ring 50 or 51 has been set in place, a hardenable epoxy resin paste may be formed thereabout to insure the absence of any voids between the reinfrocement and the underlying partially formed rod or coupling.

Figure 16:
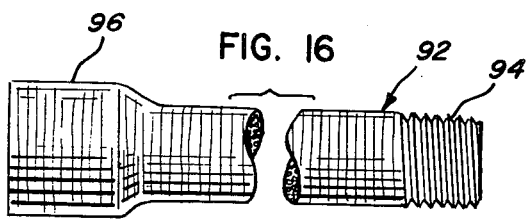
FIGS. 16 and 17 are fragmentary elevational view of rod members formed in accordance with this invention having no central reinforcing core.
Figure 17:
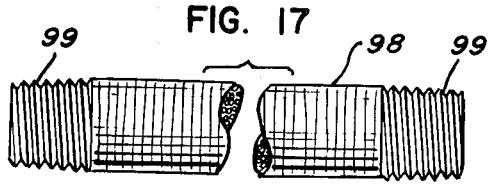

The tensioned longitudinal glass filaments of the resulting rod 90 afford such resulting rod excellent tensile strength and the rod as a whole possesses superior corrosion resistance. Male and female threads may be formed on opposed ends in the manner above described with respect to the rods having core reinforcements. Thus rod 92 of FIG. 16 having no central metal core has opposed threaded male and female ends 94 and 96, respectively, whereas rod 98 of FIG. 17 has opposed male ends 99 for engaging the female threads of a coupling such as coupling 46 of FIG. 10. The rods 90, 92 and 98 having no steel reinforcing core are lighter in weight than the previously described rods of the type illustrated in FIGS. 5 and 8 of the drawings, but while possessed of lesser flexing strength possess equal, if not superior, corrosion resistance and are intended to serve those applications where the properties of lightness in weight, high tensile strength and corrosion resistance are desired.

In view of the many modifications which may be made in the invention as above indicated, it is intended that this invention be limited only by the scope of the appended claims.

I claim:

1. A method for forming a solid rod construction of high tensile strength, comprising winding a resin-saturated spiral layer of filaments of high tensile strength under tension transversely to an innermost rotating longitudinally arranged assemblage of substantially parallel filaments of high tensile strength under tension; said filaments being of substantially equal length; winding said spiral layer in discrete strata initially contacting substantially oppositely disposed peripheral portions of said rotating longitudinal assemblage; said spiral strata being wound in the same direction of rotation while having the forces tending to urge such assemblage into a non-linear condition exerted on said longitudinal assemblage by said strata substantially oppositely disposed to each other; each of said discrete strata of said spiral layers being would simultaneously and in adjacent relation along the length of the longitudinal assemblage of substantially parallel-filaments so as to exert substantially opposite forces on the rotating longitudinal assemblage whereby the latter assemblage remains substantially linear along its entire length during rod formation; and applying additional layers of substantially parallel longitudinal and transverse filaments of high tensile strength alternately, under tension, until a rod of desired dimensions is formed; said parallel filaments and spiral filaments being saturated with said resin so as to define a solid, substantially void-free rod construction.

2. The method of claim 1 in which said filaments of high tensile strength are glass filaments.

3. A method for forming a solid rod construction comprising applying longitudinal filaments of high tensile strength under tension about the periphery of a solid rod core having high tensile strength and spaced surface indentations, said filaments being arranged substantially parallel to the longitudinal axis of said core; anchoring opposed end portions of said filaments under tension; said filaments being in engagement with the periphery of said core in the tensioned, anchored condition; increasing the tension in said longitudinal filaments by winding spirals of filaments of high tensile strength under tension transversely to the axis of said core so as to urge the longitudinal filaments into the core surface indentations; impregnating said longitudinal and spiral filaments with a curable resin whereby a substantially void-free relation is assumed between said core and an overlying shell defined by said filaments, applying additional alternate layers of resin-impregnated longitudinal and spiral filaments of high tensile strength under tension until said core indentations are filled and a cylindrical rod of desired dimensions is formed, and curing said resin with said filaments in the tensioned state into a solid, substantially void-free rod.

4. The method of claim 3 in which said resin is cured at substantially room temperature until said resin is set, continuing the cure at an elevated temperature controlled so as not to effect relative movement between the core and reinforced resin covering whereby an integral rod construction free of fissures and internal voids is assured.

5. The method of claim 3 in which an annular reinforcement, concentric with said core axis, is embedded in one end of said rod reinforced shell adjacent a core end limit, and female threads are formed about the inner periphery thereof adjacent the reinforcement whereby the shear strength of said female threads is improved.

6. The method of claim 5 in which male threads are formed about the external periphery of the rod end opposed to said one end by molding a hardenable epoxy resin composition thereover with the assistance of a male thread form.

7. The method of claim 5 in which a female thread form is placed adjacent one end of said core end limit whereafter female threads are formed thereover; said annular reinforcement being formed about said formed female threads, and hardenable epoxy resin is packed into the interval between the inner periphery of said annular reinforcement and said underlying rod portion to insure the absence of voids therebetween.

8. The method of claim 5 in which said annular reinforcement comprises a plate of high tensile steel which is formed about a female thread form abutted against one end of said core after female threads have been formed over said form.

9. The method of claim 8 in which said plate is welded snugly about the female threads which have been formed about the thread form and has projections formed on at least one surface thereof to embed said plate in the reinforced shell of said rod.

10. The method of claim 3 in which said core comprises a steel rod.

11. The method of claim 3 in combination with the steps of forming male and female threads of curable resin on the opposed ends of said rod construction.

12. The method of claim 16 in which said filaments of high tensile strength are glass filaments.

* * * * *